United States Patent
Runk et al.

(10) Patent No.: US 11,890,663 B2
(45) Date of Patent: Feb. 6, 2024

(54) DEVICE AND METHOD FOR OPENING FOLDED HEAT EXCHANGER CORES

(71) Applicant: MAHLE International GmbH, Stuttgart (DE)

(72) Inventors: Robert Louis Runk, Lockport, NY (US); Silas Goldap Goma, Amherst, NY (US)

(73) Assignee: MAHLE International GmbH, Stuttgart (DE)

( * ) Notice: Subject to any disclaimer, the term of this patent is extended or adjusted under 35 U.S.C. 154(b) by 547 days.

(21) Appl. No.: 17/029,427

(22) Filed: Sep. 23, 2020

(65) Prior Publication Data

US 2022/0088661 A1   Mar. 24, 2022

(51) Int. Cl.
| | |
|---|---|
| *B21D 3/16* | (2006.01) |
| *B21D 7/00* | (2006.01) |
| *B23P 6/00* | (2006.01) |
| *F28D 1/047* | (2006.01) |
| *B21D 53/02* | (2006.01) |
| *B23P 15/26* | (2006.01) |

(52) U.S. Cl.
CPC ............... *B21D 3/16* (2013.01); *B21D 7/00* (2013.01); *B21D 53/02* (2013.01); *B23P 15/26* (2013.01); *F28D 1/0476* (2013.01); *B23P 6/00* (2013.01); *B23P 2700/09* (2013.01); *Y10T 29/49352* (2015.01)

(58) Field of Classification Search
CPC ... B21D 7/00; B21D 7/04; B21D 7/10; B21D 9/05; B21D 9/07; B21D 7/076; B21D 53/06; B21D 3/16; B23P 6/00
See application file for complete search history.

(56) References Cited

U.S. PATENT DOCUMENTS

| | | | | |
|---|---|---|---|---|
| 4,788,847 A | * | 12/1988 | Sterghos | B21D 7/06 72/389.8 |
| 5,531,268 A | | 7/1996 | Hoshino et al. | |
| 9,528,770 B2 | | 12/2016 | Jiang et al. | |
| 2014/0165687 A1 | * | 6/2014 | Lee | B21D 9/076 72/309 |
| 2018/0214928 A1 | * | 8/2018 | Pfaender | B21D 22/025 |

* cited by examiner

*Primary Examiner* — Christopher J Besler
(74) *Attorney, Agent, or Firm* — Dickinson Wright PLLC

(57) ABSTRACT

A device is configured for opening a heat exchanger core from a U-shape to a V-shape. Such heat exchanger core has a plurality of parallel flat tubes, each having two ends; and two manifolds. Each of the flat tubes has two straight sections adjacent to the manifolds and an intermediate bent section. The device has two hinged frames, a respective clamp arrangement on each of the hinged frames for holding the two manifolds, and a trough shaped support for the intermediate portion. For opening the U-shaped heat exchanger core, the heat exchanger core is inserted into the device, and the two manifolds are secured with the clamp arrangements. The clamp arrangements are separated from one another by pivoting apart the two hinged frames, on which the clamps are mounted. Simultaneously, the intermediate bent section is pushed toward the trough adapted to provide a desired curvature to the intermediate section.

12 Claims, 3 Drawing Sheets

DEVICE AND METHOD FOR OPENING FOLDED HEAT EXCHANGER CORES

TECHNICAL FIELD

The present disclosure relates to a device and a method for unfolding folded heat exchanger cores with folded or extruded microchannel tubes.

BACKGROUND

Typically, heat exchanger refrigerant tubes with internal microchannels have a flattened elongated cross-section. Such tubes are formed of bent sheet metal or may be extruded. Some heat exchangers have a bent core as to form a V-shaped profile when installed. This allows passing air to cool two consecutive portions of the same tube. Tubular manifolds are sealingly connected to the tubes at the free ends of the legs of the V-shape. Corrugated fins extend between adjacent tubes and are in contact with the flattened walls of the tubes along the legs of the V-shape. In the bent intermediate portion, the tubes are twisted so that the bend axis of the tubes extends parallel to the respective manifold axes.

For saving cost and space during transport, such cores may be folded in half into a U-shape to increase packing density when shipping such that the legs of the U-shape extend parallel to each other. The folded tubes will then need to be opened up to attain a specified angle of the V-shape for further assembly and installation. Unbending these tubes can lead to unpredictable and unwanted dimensions. There is also the possibility of damage to the tubes if the opening process is not performed in a suitable way. Further, these folded tubes take a large amount of force to open, and an even greater force when attempting to reach a specific shape. This force is greater than permissible for manually exerted forces by an operator.

SUMMARY

The present disclosure describes a device configured for opening a heat exchanger core from a U-shape to a V-shape. Such heat exchanger core has a plurality of parallel flat tubes, each having two ends; and two manifolds, each of which being attached to one of the two ends of each tube; wherein each of the flat tubes has two straight sections adjacent to the manifolds and an intermediate bent section. The device has two hinged frames pivotable about a hinge location, a respective clamp arrangement on each of the hinged frames for holding a respective one of the two manifolds, and a trough shaped support for the intermediate portion.

The clamps may be spring-loaded to urge the manifolds toward the trough. The hinged frames may be configured to pivot from a parallel configuration to an angled configuration relative to each other via a linkage driven by an electric motor.

The linkage may be coupled to a traveling block of a spindle drive with a screw rotated by the electric motor.

A stop may be positioned on the spindle drive to limit a travel of the traveling block. Otherwise, an opening stop may be placed elsewhere to limit the hinge angle of the hinged frames.

The trough may have a rounded bottom adapted to a predetermined curvature of the intermediate portion.

The hinge location of the two hinged frames may be a joint hinge axis of the two hinged frames located above the bottom of the trough.

For opening the heat exchanger core from the U-shape to the V-shape, the U-shaped heat exchanger core is inserted into the device, and the two manifolds are secured with the clamp arrangements. The clamp arrangements are separated from one another by pivoting apart the two hinged frames, on which the clamps are mounted. Simultaneously, the intermediate bent section is pushed toward the trough, which is adapted to provide a desired curvature to the intermediate section.

Further details and benefits of the present disclosure become apparent from the following description of the appended drawings. The drawings are provided herewith purely for illustrative purposes and are not intended to limit the scope of the present invention.

DETAILED DESCRIPTION OF THE DRAWINGS

Figure 1:
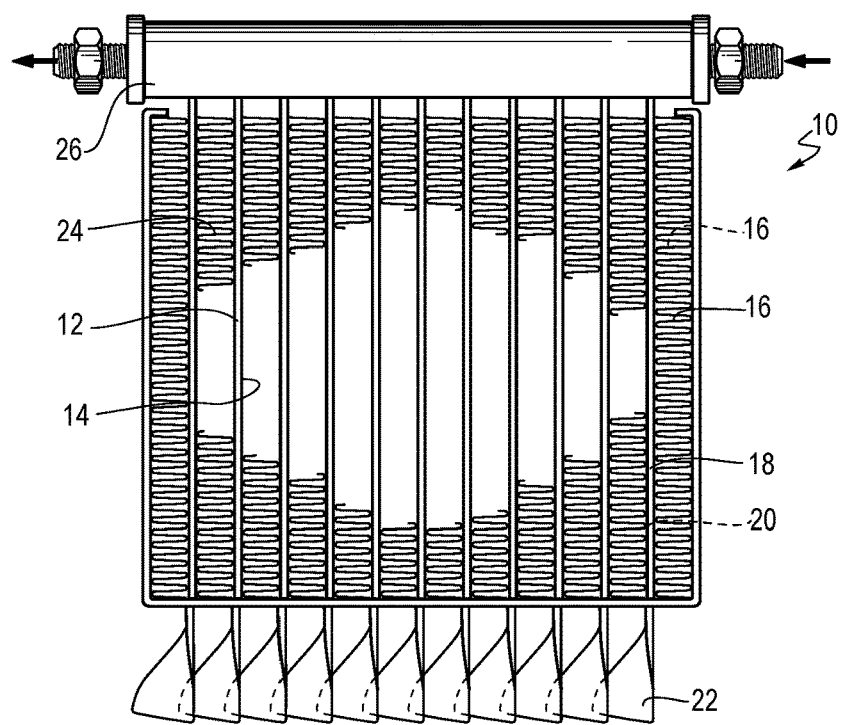
FIG. 1 shows a heat exchanger with a folded core.
Figure 2:
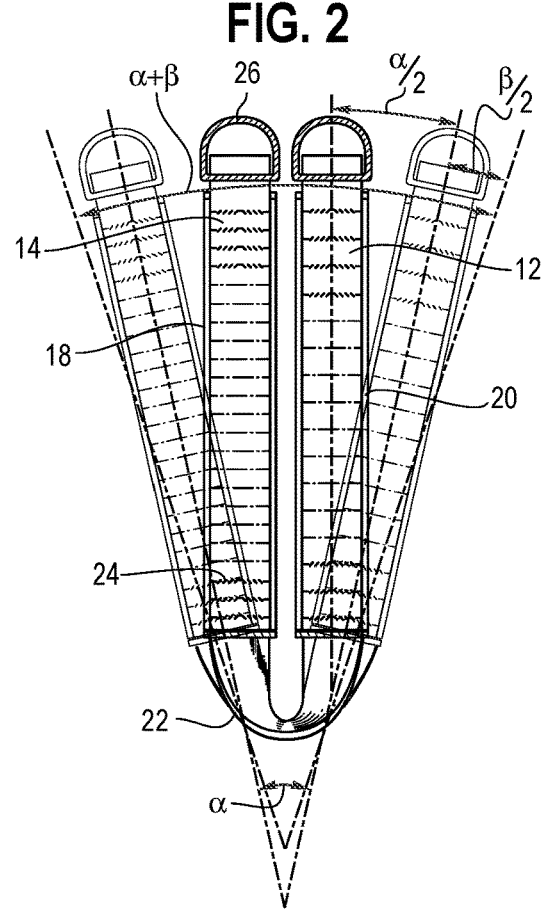
FIG. 2 shows a vertical cross-section through the heat exchanger f FIG. 1

A heat exchanger 10 as shown in FIGS. 1 and 2 includes an array of flat refrigerant tubes 12 of a flattened, elongate cross section with flat walls 14. The heat exchanger 10 has two core sections 16, one of which is visible in FIG. 1, while the other one is located behind the image plane, concealed by the shown core section 16. Within the core section 16, the flat walls 14 of the refrigerant tubes face respective flat walls 14 of adjacent refrigerant tubes. Interior walls extend inside the refrigerant tubes along the length of the tubes 12, separating several microchannels from each other as generally known in the art. Within the straight core sections 16, corrugated fins 24 are disposed between adjacent tubes 12 and make contact with the flat walls 14 facing the corrugated fins 24.

Each of the flat tubes 12 shown in FIGS. 1 and 2 has a first straight section 18 extending along the core section 16 shown, a second straight section 20, extending along the core section behind the image plane, and an intermediate portion 22 connecting the straight sections 18 and 20. This intermediate portion 22 of each tube 12 is bent and twisted to have a predetermined helical angle relative to the straight sections 18 and 20. In this embodiment, the bent and twisted intermediate portion 22 is originally U-shaped such that the straight sections 2 and 3 of each tube 12 extend in parallel with each other with each of the flat walls 14 of a given refrigerant tube 12 extending in the same vertical plane in both core sections 16, i.e. in both straight sections 18 and 20 of the refrigerant tube 12. A view onto such a vertical plane is shown in FIG. 2.

The array of tubes 12 that is bent into a U-shape for transport, needs to be opened into a V-shape such that the straight sections 18 and 20 extend at a predetermined angle α relative to each other or, in other words, at a predetermined angle α/2 relative to their U-shaped transport configuration with parallel core sections 16. The bent and twisted intermediate portions 22 may not necessarily be positioned exactly in the center of the array of tubes 12.

The bent and twisted intermediate portion 22 of each of the refrigerant tubes 12 is dimensioned as short as the torsional strength of the tube 12 allows. Any specific configuration and radius of curvature may be employed so long as the internal microchannels inside the tubes 12 are not pinched. As seen in FIG. 1, the bent and twisted intermediate portions 22 of the adjacent tubes 12 may overlap each other, depending on the spacing of the flat tubes 12 from each other with respect to their width. The bent and twisted intermediate portions 22 may be brazed or otherwise secured one to another to further raise the strength.

Hollow manifolds 26 are connected to the ends of the array of flat tubes 12. Both the manifolds 26 and the flat tubes 12 may be made of aluminum of another material suitable for brazing and flexible enough for bending.

Figure 3:
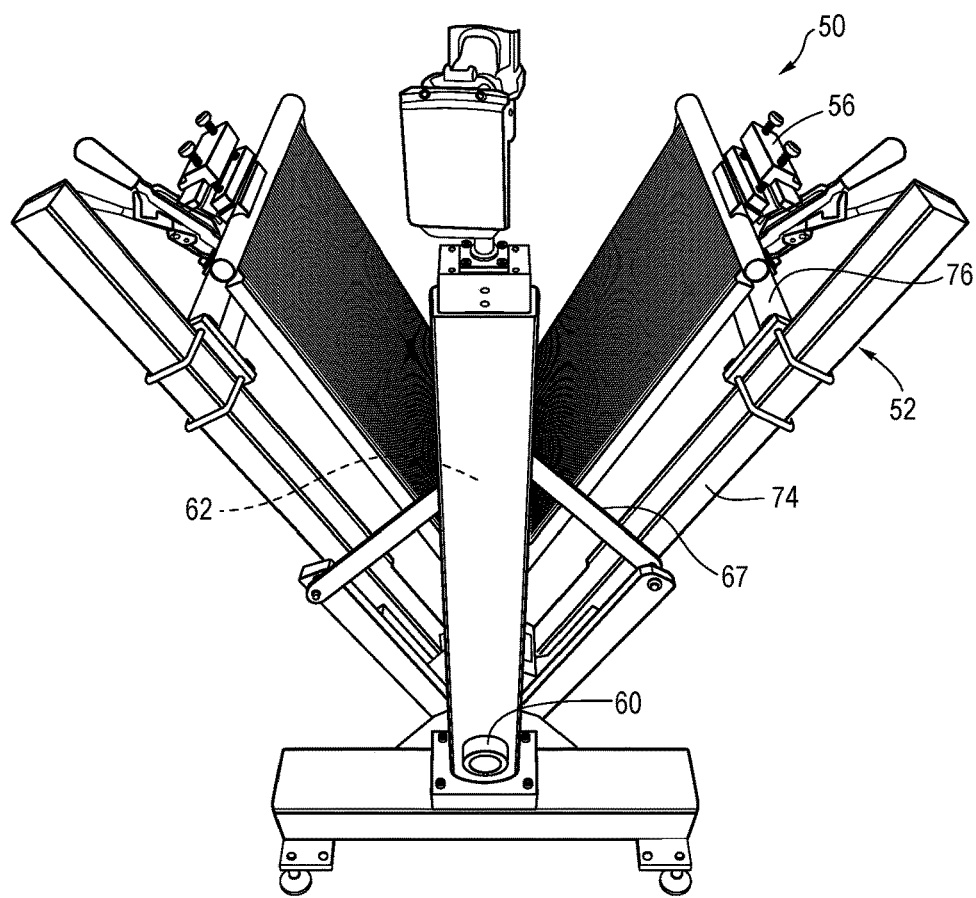
FIG. 3 shows a device for opening the folded tubes of a folded heat exchanger core.
Figure 4:
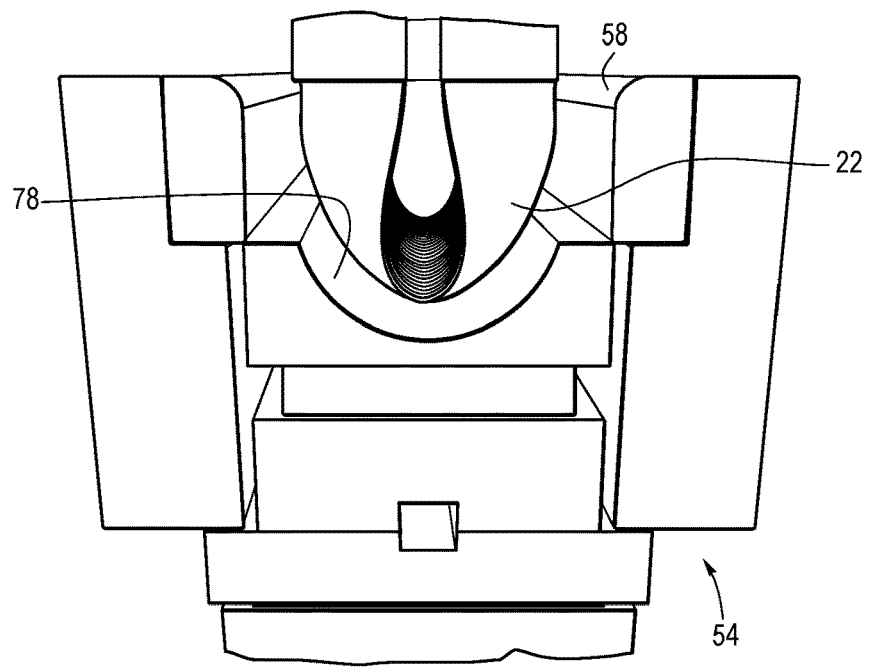
FIG. 4 shows a detail view of a device equal or similar to the one shown in FIG. 3.
Figure 5:
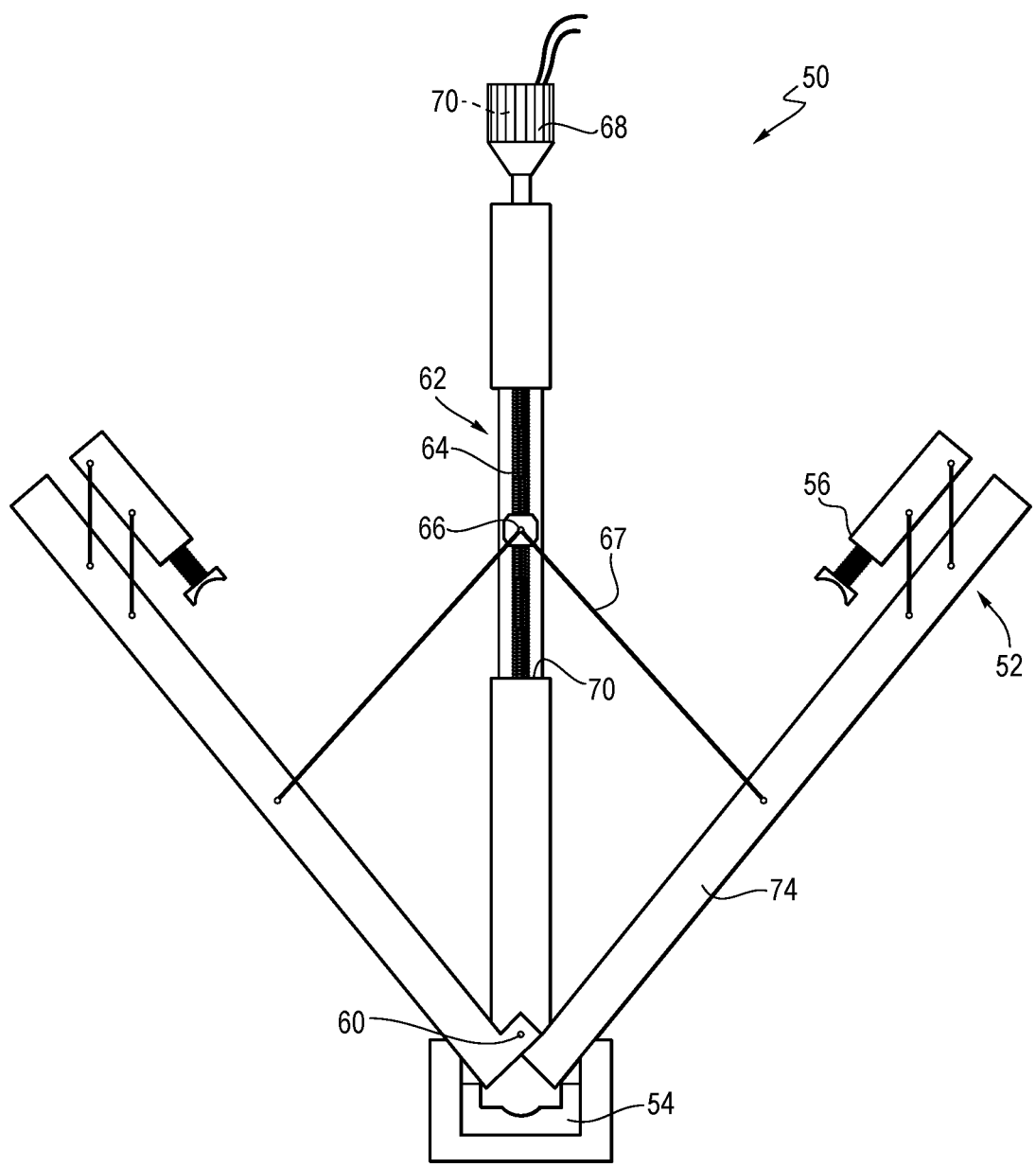
FIG. 5 shows a schematic view of a device for opening the folded tubes to highlight further details.

FIGS. 3 and 5 show a side views onto a device 50 for bringing the flat tubes 12 from a U-shape to a V-shape as schematically shown in FIG. 2. The device 50 for opening the folded array of microchannel tubes 14 does so without damaging the tubes 12 while ensuring that the final end product meets all specified requirements. The device 50 has a pair of hinged frames 52 and a central trough 54 made from a material that will not damage the walls 14 or the microchannels of the tubes 12. An example of a suitable shape of the trough 54 is shown in FIG. 4.

Spring-loaded clamps 56 are mounted on each frame 52 to hold down the manifolds 26 to keep the bent intermediate portions 22 in contact with the trough 54. The frames 52 carrying the clamps 56 then swing outward while the clamps 56 push the manifolds 26 of the heat exchanger 10 down while opening the array of tubes 12 to a predetermined dimension or angle α. The trough 54 is shaped to give the intermediate portions 22 the wanted curvature and end shape after the tubes 12 are opened.

As shown in FIG. 4, the trough 54 has special lateral guides 58 that control the width of the bent intermediate portion 22 as the array of tubes 12 is being opened. These guides 58 are dimensioned to force the bent intermediate portion 22 to attain a shape equivalent to the shape attained if the array of tubes 12 is bent from a straight starting configuration, i.e. when the array of tubes 12 is not first folded into the U-shape. These guides 58 also give a very repeatable dimension of the opening angle α and help the bent intermediate portion 22 to smoothly transition into the straight sections 18 and 20. The straight sections 18 and 20 of the tubes 12 have a tendency to bow near the intermediate portion 22 when the array of tubes 12 is opened or closed. The guides 58 counter the bowing when the array of tubes 12 is being opened, by restricting the movement of the array of tubes 12, to allow the straight sections 18 and 20 to be perfectly straight near the bent intermediate portion 22. This is significant for some applications, in which the array of tubes 12 is used in the V-shape configuration, where this area is used as an attachment interface with an air-guiding or condensation-catching device. Such attachment interface may have a length of about a triple tube width. For example, the total height of the guides may be around 40-70 mm. These dimensions give the intermediate portion 22 a repeatable shape that does not excessively stress the tubes 12.

The bottom 78 of the trough 54 has a specially designed rounded shape to center the array of tubes 12 in the trough 54 while allowing the tubes 12 to move when the array of tubes 12 is opened. The trough 54 provides enough support to guarantee the array of tubes 12 is not damaged, but is shallow enough to ensure that the tubes 12 are not dented by the lateral edges of the trough 54 while the intermediate portions 22 are moving. The trough 54 is configured to allow the tubes 12 to move while being opened. The trough 54 is as shallow as possible while still providing the function of centering the array of tubes 12. The centering portion at the bottom 78 of the trough 54 is only a few millimeters high.

In the example of FIG. 4, the lateral guides 58 and the bottom 78 of the trough 54 are formed of inserted modular blocks that are exchangeable for implementing different sizing of the trough 54.

As the bent intermediate portions 22 are expanded, the tubes 12 have a tendency lift off the bottom 78 of the trough 54 when the array of tubes 12 is opened. The tubes 12 moving outward and lifting off of the bottom 78 of the trough 54 create a gap between the tubes 12. The amount the tubes 12 move and the spacing of the gap is controlled by the shape of the bottom 78 of the trough 54, the width of the trough guides 58, and the angle α to which the array of tubes 12 is opened. This combination of features gives a very consistent and repeatable shape to the bent intermediate portion 22 with a uniform alignment of the array tubes 12.

As the array of tubes 12 is opened and the intermediate portion 22 is urged to lift out of the trough 54, the device 50 controls this through spring loaded or pneumatic clamps 56 that hold the array of tubes 12 in the trough 54. In the embodiment of FIG. 5, the spring-loaded clamps 56 swing at a specified radius in order to allow the clamps 56 to securely hold the array of tubes 12 against the trough 54 the entire time. The clamps 56 slowly compress and apply more pressure as the array of tubes 12 is opened. This is controlled by the hinge location 60 of the frames 52 carrying the clamps 56 relative to the trough 54. The hinge location 60 for the frames 52 is just above the top of the trough 54. This keeps the intermediate portion 22 of the array of tubes 12 in the trough 54 and helps reach the desired end shape.

The device 50 has a spindle drive 62 with a screw 64 and a traveling block 66 for vertically moving a linkage 67 connected to the lateral hinged frames 52 that hold the clamps 56. This screw 64 is rotated by an electric motor 68, e.g. a servo motor. When the screw 64 turns, the traveling block 66 moves up and down. The vertical motion translates to a scissor action which swings the two frames 52 carrying the clamp assemblies outwards to open the array of tubes 12. This drive system reduces the physical force required from the operator because the device 50 is activated by pressing a button or the like. This drastically improves the ergonomics of the machine.

The design of the device 50 allows the clamps 56 holding the manifolds to swing to any desired angle α or distance apart. The frames 52 are adjustable to adapt the height of the clamps 56 to the position of the respective manifolds to be held. The device 50 has an opening stop 70 that prevents the array of tubes 12 from opening too far, for example by limiting the travel of the traveling block 66. This opening stop 70 is easily adjusted to achieve the opening angle α in the final product. Notably, the opening stop is set to a frame angle corresponding to the opening angle α plus the added spring-back angle β to account for the heat exchanger core spring-back action when the force acting on the tubes 12 is released. The amount of spring-back, shown in FIG. 2 as angle β, with β/2 amounting to the portion of the spring-back angle α located to each side of the heat exchanger core, is experimentally determined for a given type of heat exchanger core and depends on the size, shape, material, and opening angle α of the array of tubes 12. Optionally the device 50 is equipped with an electronically controlled motor 68 programmable to move to any frame angle on a case-by-case basis so that the stop is not needed. This eliminates the need to physically reconfigure the device 50 for different constellations.

The frames 52 are configured to move at the same time by the same amount relative to the center of the device 50, i.e. relative to the trough 54. This prevents that one side opens farther than the other to end up with a heat exchanger core that is not opened evenly.

In addition to the opening stop 70 to set the opening angle of the frames, the array of tubes 12 and there is a spring-back stop which is used for taking up the spring-back of the array of tubes 12. The spring-back stop limits the amount of spring-back of the array of tubes 12 after it is opened. If the device 50 is not set to the spring-back stop after the array of tubes 12 is opened the array of tubes 12 may jump violently when the clamps 56 are released and the array of tubes 12 may be damaged or injure the operator. The spring-back stop is a loose stop that is inserted only after the coil is opened and it rides on the traveling block 66 until it hits the upper limit of the traveling block 66. The spring-back stop provides added safety to the device 50 that gives a repeatable outcome and a specific designed shape without damage to the array of tubes 12. The spring-back stop may be provided by the servo motor 68, once the spring-back distance is determined.

All of the edges of the device 50 close to where the array of tubes 12 is positioned are rounded, and multiple locations on the device 50 have padding, for example in the form of foam strips, to avoid scratching the array of tubes 12.

The clamps 56 are also molded to complement the shape of the manifold so that the manifolds do not get deformed as the clamps 56 force the array of tubes 12 into the trough 54. There is a lot of force from the springs in the clamps 56 as the array of tubes 12 is opening, so the device 50 is made to prevent dents in or damage to the array of tubes 12.

The clamp mounting allows the device 50 to fit any length array of tubes 12. As shown in FIG. 3, the frames 52 include hinged arms 74, to which horizontal bars 76 are adjustably mounted to adapt to different sizes of heat exchanger cores. The clamps 56 are mounted on the horizontal bars 76. The design is scalable so that it can expand various arrays of tubes 12 of various widths and lengths to various opening angles α.

While the above description constitutes the preferred embodiments of the present invention, the invention is susceptible to modification, variation and change without departing from the proper scope and fair meaning of the accompanying claims. While the device 50 is shown with the trough 54 at the bottom 78, different orientations of this device would accomplish the same goals. Accordingly, any reference to height, or upward and downward directions relate to the orientation shown in the drawings and would be changed in analogy if the device 50 were to be set up in a different orientation.

Other options that this device offers are upside down and horizontal orientations that could be configured to have the same features and end with the same product.

The width of the trough may be varied, for example by using exchangeable inserts, in order to control the shape of the intermediate portion 22 of array of tubes 12. It is feasible to have trough widths within the range of twice to four times the tube width, which is the depth of the heat exchanger core. For example, the trough shown in FIG. 4 has a width of about 2.5 to 3 times the tube width. The total depth of the trough could be between 40 mm and 80 mm, depending on the tube width and the desired curvature radius of the intermediate portion 22.

The trough could be implemented in different shapes to center and support the array of tubes 12 enough to guide the shape of the bend region. For example, the rounded trough could be almost flat at the bottom 78 or it could be a half-pipe shape with the radius of twice to four times the tube width. Likewise, the trough could be very shallow and still provide enough centering guidance. The feasible range of trough depths is 1 mm through 40 mm.

The array of tubes 12 could be held in a number of ways that would accomplish the same task of pushing the bent tube region into the trough. Instead of clamping to the manifolds, the device 50 could clamp to the array of tubes 12 faces to pull the array of tubes 12 open.

The force used to keep the array of tubes 12 in the trough could be by tension instead of compression, meaning some sort of spring pulling the array of tubes 12 down from the bottom side instead of pushing from the top. Also, if the device 50 is automated the clamps may be programmed to provide a defined force increase as the array of tubes 12 is opened. The pivot location 60 for the frames 52 is generally between 30 mm and 150 mm from the base of the trough.

Other than electric motor 68, the device 50 could be powered by hydraulics or pneumatics in order to get the force under the accepted or specified safe operator ergonomic limit. Also the spindle drive 62 could be replaced with a chain mechanism or a pneumatic or hydraulic piston to open the array of tubes 12. Even extending handles would allow a mechanical advantage by the operator to open the array of tubes 12 while staying under the accepted or specified ergonomic safety limit for manual operation.

Besides using hard stops and motor-controlled positions; it is also possible to use limit switches or resistance measurement to find the location that the device 50 needs to be opened to for each specific array of tubes 12.

Instead of controlling the motion of both sides of the array of tubes 12 mechanically, being physically error-proofed, it is possible for specific applications to control each side independently and match the opening rate or angle of each side.

Another way to get the spring-back safely out of the array of tubes 12 is to have a force sensor reading the return force exerted by the array of tubes 12. When the sensor reading is below a certain threshold, the spring-back angle β has been compensated and the array of tubes 12 can be safely unclamped. This sensor could be on the array of tubes 12 itself, on the device 50 checking the force it takes to move, or a feedback sensor in the control motor that tells when the device 50 is no longer getting an assist from the array of tubes 12 wanting to close.

There are more ways to protect the array of tubes 12 such as increased radii, more padding, and more plastic components, but any of these changes alone would still apply to the same method of unbending the array of tubes 12.

What is claimed is:

1. A device for opening a heat exchanger core from a U-shape configuration to a V-shape configuration, the heat exchanger core having a plurality of parallel flat tubes, each having two ends; and two manifolds, each of which being attached to one of the two ends of each tube; wherein each of the flat tubes has two straight sections adjacent to the manifolds and an intermediate bent section, the two straight sections being parallel to one another when the heat exchanger core is in the U-shape configuration, the device comprising:

two hinged frames pivotable about a hinge location, a respective clamp arrangement on each of the hinged frames for holding a respective one of the two manifolds, and a trough shaped support for the intermediate portion;

wherein the device is configured to open the heat exchanger core to the V-shape configuration, such that a predetermined angle α exists between the two straight sections;

wherein the hinge location is a joint hinge axis of the two hinged frames and is located above a bottom of the trough shaped support.

2. The device of claim 1, wherein the clamp arrangement comprises a clamp that is spring-loaded to urge the manifolds toward the trough shaped support.

3. The device of claim 1, wherein the hinged frames are pivotable from a parallel configuration to an angled configuration relative to each other.

4. The device of claim 1, wherein the hinged frames are configured to be moved synchronously by a linkage driven by an electric motor.

5. The device of claim 4, wherein the linkage is coupled to a traveling block of a spindle drive.

6. The device of claim 5, wherein the spindle drive comprises a screw rotated by the electric motor.

7. The device of claim 6, wherein a stop is positioned on the spindle drive to limit a travel of the traveling block.

8. The device of claim 1, further comprising an opening stop limiting a hinge angle of the hinged frames.

9. The device of claim 1, wherein the trough shaped support has a rounded bottom adapted to a predetermined curvature of the intermediate portion.

10. The device of claim 9, wherein the trough shaped support further has lateral guides raised above the rounded bottom of the trough shaped support and configured to support the tubes after opening the heat exchanger core.

11. The device of claim 10, wherein the bottom of the trough shaped support and the lateral guides are replaceable inserts.

12. The device of claim 1, wherein the clamp arrangement has a profile complementary to the manifolds to be held.

* * * * *